(12) United States Patent  
Chickmenahalli et al.

(10) Patent No.: US 8,348,313 B2
(45) Date of Patent: Jan. 8, 2013

(54) ENERGY ABSORBER FOR VEHICLE BUMPER

(75) Inventors: Arun Chickmenahalli, Ann Arbor, MI (US); Liwu Zhou, Troy, MI (US); Jeffrey E. Leich, Jr., Shelby Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 51 days.

(21) Appl. No.: 12/872,549

(22) Filed: Aug. 31, 2010

(65) Prior Publication Data

US 2012/0049546 A1  Mar. 1, 2012

(51) Int. Cl.
*B60R 19/18* (2006.01)
(52) U.S. Cl. .................................. 293/120; 293/121
(58) Field of Classification Search ........... 293/120–122
See application file for complete search history.

(56) References Cited

U.S. PATENT DOCUMENTS

| | | | |
|---|---|---|---|
| 4,131,702 A | 12/1978 | Alfter et al. |
| 5,833,304 A | 11/1998 | Daniel et al. |
| 6,012,764 A | 1/2000 | Seksaria et al. |
| 6,036,227 A | 3/2000 | Lin et al. |
| 6,475,937 B1 | 11/2002 | Preisler et al. |
| 6,652,021 B1 | 11/2003 | Dykman et al. |
| 6,715,592 B2 | 4/2004 | Suzuki et al. |
| 6,733,064 B2 | 5/2004 | Fox et al. |
| 6,887,552 B2 | 5/2005 | Dykman et al. |
| 6,942,076 B2 | 9/2005 | Suzuki et al. |
| 7,052,056 B2 | 5/2006 | Weissenborn et al. |
| 7,182,908 B2 | 2/2007 | Preisler et al. |
| 7,222,896 B2 * | 5/2007 | Evans ........................... 293/120 |
| 7,249,662 B2 | 7/2007 | Itou |
| 7,384,095 B2 | 6/2008 | Cormier et al. |
| 7,513,566 B2 | 4/2009 | Ludwig |
| 7,677,640 B2 | 3/2010 | Dix et al. |
| 7,708,313 B2 | 5/2010 | Haba et al. |
| 7,810,871 B2 | 10/2010 | Matsui |
| 7,866,716 B2 * | 1/2011 | Perucca et al. ................ 293/133 |
| 7,954,883 B2 | 6/2011 | Benkler et al. |

(Continued)

FOREIGN PATENT DOCUMENTS

JP 58053541 3/1983

OTHER PUBLICATIONS

Electronic Code of Federal Regulations: 49 CFR 571.201 Standard No. 201; Occupant protection in interior impact; downloaded Apr. 24, 2012 from http://ecfr.gpoaccess.gov/cgi/t/text/text-idx?type=simple;c=ecfr;cc=ecfr;sid=74119d4764e (23 pages).

(Continued)

*Primary Examiner* — Dennis Pedder
(74) *Attorney, Agent, or Firm* — Grossman, Tucker, Perreault & Pfleger, PLLC

(57) ABSTRACT

An energy absorber for a vehicle includes an elongate member having one or more corrugated sections, the corrugated sections including a plurality of channels wherein the channels include a generally planar front wall and a pair of spaced apart vertically extending side walls, and one or two at least partial end walls. The elongate member further includes a base section extending between channels and one or more flanges that may extend from the base. The energy absorber may be tuned for a desired impact and be located between a bumper beam and a fascia at the front or rear end of a vehicle to provide low speed impact protection.

20 Claims, 4 Drawing Sheets

U.S. PATENT DOCUMENTS

| | | | |
|---|---|---|---|
| 7,971,903 B2 * | 7/2011 | Haba et al. | 280/751 |
| 8,016,331 B2 * | 9/2011 | Ralston et al. | 293/120 |
| 2004/0198123 A1 | 10/2004 | Gillingham et al. | |
| 2005/0057053 A1 * | 3/2005 | Evans et al. | 293/133 |
| 2005/0161982 A1 | 7/2005 | Cormier et al. | |
| 2005/0168015 A1 | 8/2005 | Davey et al. | |
| 2005/0258668 A1 | 11/2005 | Brown | |
| 2006/0103172 A1 | 5/2006 | Veen et al. | |
| 2007/0046010 A1 | 3/2007 | Haba et al. | |
| 2007/0046073 A1 | 3/2007 | Ludwig et al. | |
| 2007/0182216 A1 | 8/2007 | Ludwig | |
| 2008/0122259 A1 | 5/2008 | Matsui | |
| 2008/0174152 A1 | 7/2008 | Cormier et al. | |
| 2008/0265622 A1 | 10/2008 | Benkler et al. | |
| 2009/0026800 A1 | 1/2009 | Asenkerschbaumer et al. | |
| 2009/0152904 A1 | 6/2009 | Arellano et al. | |
| 2011/0109105 A1 * | 5/2011 | Ralston et al. | 293/132 |

OTHER PUBLICATIONS

Electronic Code of Federal Regulations: 49 CFR 581-Bumper Standard; downloaded Apr. 24, 2012 from http://ecfr.gpoaccess.gov/cgi/t/text/text-idx?c=ecfr&sid=876e7657a437a141c033a77d24da (5 pages).

U.S. Office Action dated Oct. 7, 2011 issued in U.S. Appl. No. 12/872,487 (11 pages).

* cited by examiner

ENERGY ABSORBER FOR VEHICLE BUMPER

FIELD

Embodiments of the present disclosure relate to the field of energy absorbers for vehicles, particularly for protection against vehicle damage in the case of 5 mph impact on the bumpers of motor vehicles.

BACKGROUND

Energy absorbers may aid in preventing damage to vehicles, particularly in low speed collisions, such as at or below 5 mph. In one exemplary application, an energy absorber may be positioned in front of a bumper beam and behind a decorative fascia at the front or the rear of a motor vehicle. One such prior art energy absorber may comprise a combination of injection molded blocks with foam blocks interspersed between the injection molded blocks, attached to a bumper beam. FIGS. 1 and 1A illustrate such a construction.

Although such an energy absorber may be effective, the use of multiple separate components that must be assembled together may result in higher molding and tooling costs providing complexity. Assembling separate components to form an energy absorber may be a complex process and may require an excessive amount of labor. It may therefore be desirable to provide a molded energy absorber made of a tunable and lightweight material that only requires attachment to a bumper beam.

Additionally, vehicles may be of different weights and sizes which may further complicate the management of energy during an impact. Providing an energy absorber capable of effectively managing a 5 mph impact of a 2500 lb. car vs. effectively managing a 5 mph impact of a 3500 lb may result in quite different dimensional requirements. It would therefore be desirable to provide a single general energy absorber configuration that can be easily tuned to cover a wide range of vehicle sizes and weights without major geometry changes so that the amount of MVSS testing may be minimized.

The Federal Government mandates low speed vehicle testing and compliance under CMVSS 215 to provide vehicles that can undergo a low speed (5 mph or less) impact against a pole, another vehicle or other object without specific damage. CMVSS 215 is a Standard set up to test a front or rear bumper with a series of pendulum impacts followed by a 5 mph flat barrier impact. This standard only applies to passenger cars. NHTSA 581 is a Standard that establishes requirements for the impact resistance of vehicles in low speed front and rear collisions. It is intended to reduce physical damage to the front and rear ends of a passenger motor vehicle from low speed collisions. The test consists of a 5-hit pendulum series where the last impact is a 2.5 mph flat barrier.

More specifically, CMVSS 215 includes two longitudinal pendulum impacts at 5 mph (height between 16 and 20 inches), one corner high pendulum impact at 3 mph (pendulum impacts shall be spaced apart by at least 2 inches vertically or 12 inches horizontally) and a flat barrier conducted at 5 mph, the impacts done in series.

NHTSA (FMVSS) part 581 includes two longitudinal pendulum impacts at 2.5 mph (height between 16 and 20 inches), two corner pendulum impacts at 1.5 mph (pendulum impacts shall be spaced apart by at least 2 inches vertically or 12 inches horizontally) and a flat barrier conducted at 2.5 mph, the impacts done in series. Planer loads during an impact can not exceed 2000 lbs. No paint/finish separation is allowed. No fastener breakage is allowed.

Additional judgment criteria that apply to both standards after impact include that
lamps and reflectors are free of cracks
Headlamps are adjustable per part 108.1 and SAE J599
hood, trunk and doors operate normally
fuel and cooling systems operate normally with no leaks
the exhaust exhibits no leaks or constrictions, and
the propulsion, suspension, steering and braking all operate in normal manner.

SUMMARY

Various embodiments of an energy absorber are disclosed herein. In a first embodiment, an energy absorber for a vehicle having a bumper beam is provided, the energy absorber comprising a molded elongate member having a longitudinal axis, engaged to the bumper beam and including one or more corrugated sections, the corrugated sections including a plurality of channels having a depth. The channels also have a front wall and a pair of spaced apart vertically extending side walls having a length, and one or two at least partial end walls. The vertically extending side walls have a length that is greater than the depth and the elongate member further includes a base section extending between the channel walls and one or more flange portions that extend from said base and at least one attachment section for engagement to the bumper beam.

In another exemplary embodiment the present disclosure relates to an energy absorbing system for a vehicle, the system comprising a bumper beam and an energy absorber, the absorber comprising a molded elongate member having a longitudinal axis and including one or more corrugated sections. The corrugated sections include a plurality of channels having a depth wherein the channels include a front wall and a pair of spaced apart vertically extending side walls and one or two at least partial end walls. The vertically extending side walls have a length that is greater than said depth and the elongate member further includes a base section extending between the channel walls and one or more flanges that extend from the base and at least one attachment section mounting the absorber to the bumper beam. The system also includes fascia overlying the absorber and the beam.

BRIEF DESCRIPTION OF THE DRAWINGS

The description herein makes reference to the accompanying drawings wherein like reference numerals refer to like parts throughout the several views, and in which.

Those of ordinary skill in the art will appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention

DETAILED DESCRIPTION

Detailed embodiments of the present disclosure are disclosed herein; however, it is to be understood that the disclosed embodiments are merely exemplary of the disclosure that may be embodied in various and alternative forms. The figures are not necessarily drawn to scale. Some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure.

Figure 1:
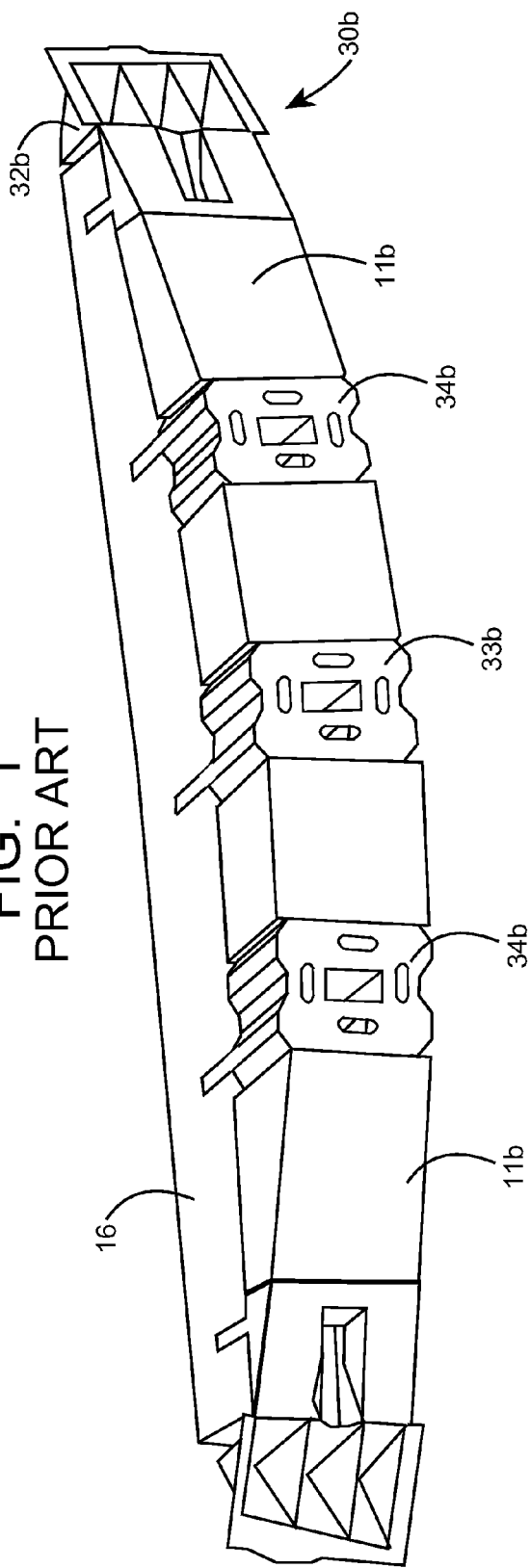
FIGS. 1 and 1A are perspective views illustrating a prior art energy absorber for a bumper.
Figure 1A:
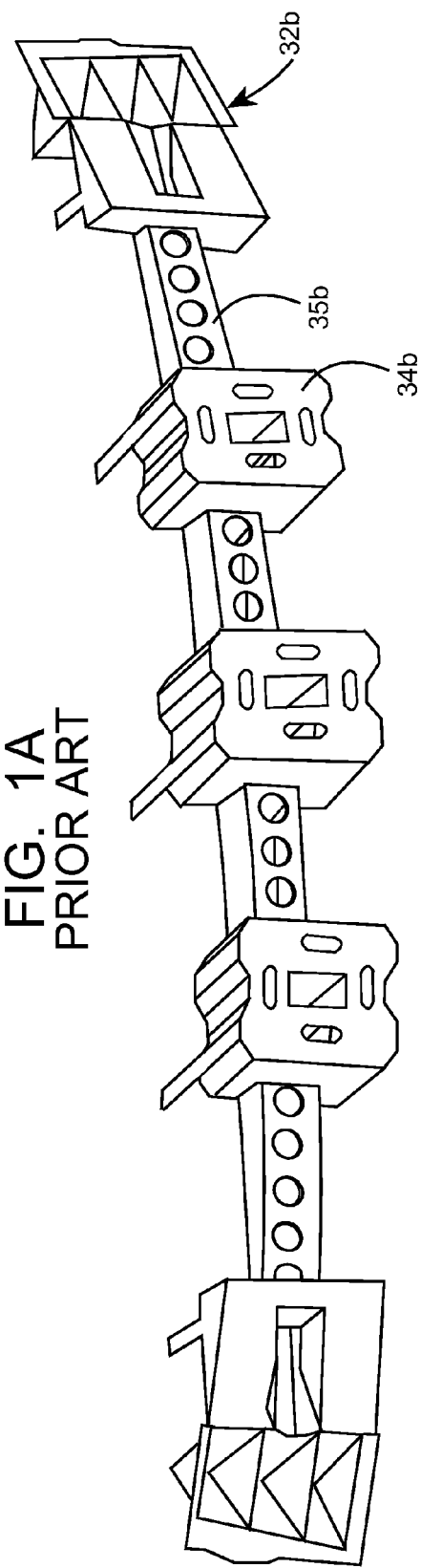

FIGS. 1 and 1A are examples of a prior art energy absorber as disclosed in U.S. Pat. No. 7,052,056 to Netshape Corporation. It appears to be directed in one embodiment to a bumper system including a bumper beam 16 having a face and ends, and an energy absorber 30b mounted on the face. The energy absorber may include a one piece injection-molded non-foam piece with box sections 33b, 34b and interconnecting straps, and a one-piece or multi-piece foam component 11b insert-molded onto the injection-molded non-foam piece. Straps 35b connect the sections 33b, 34b. (FIG. 1A)

Figure 2:
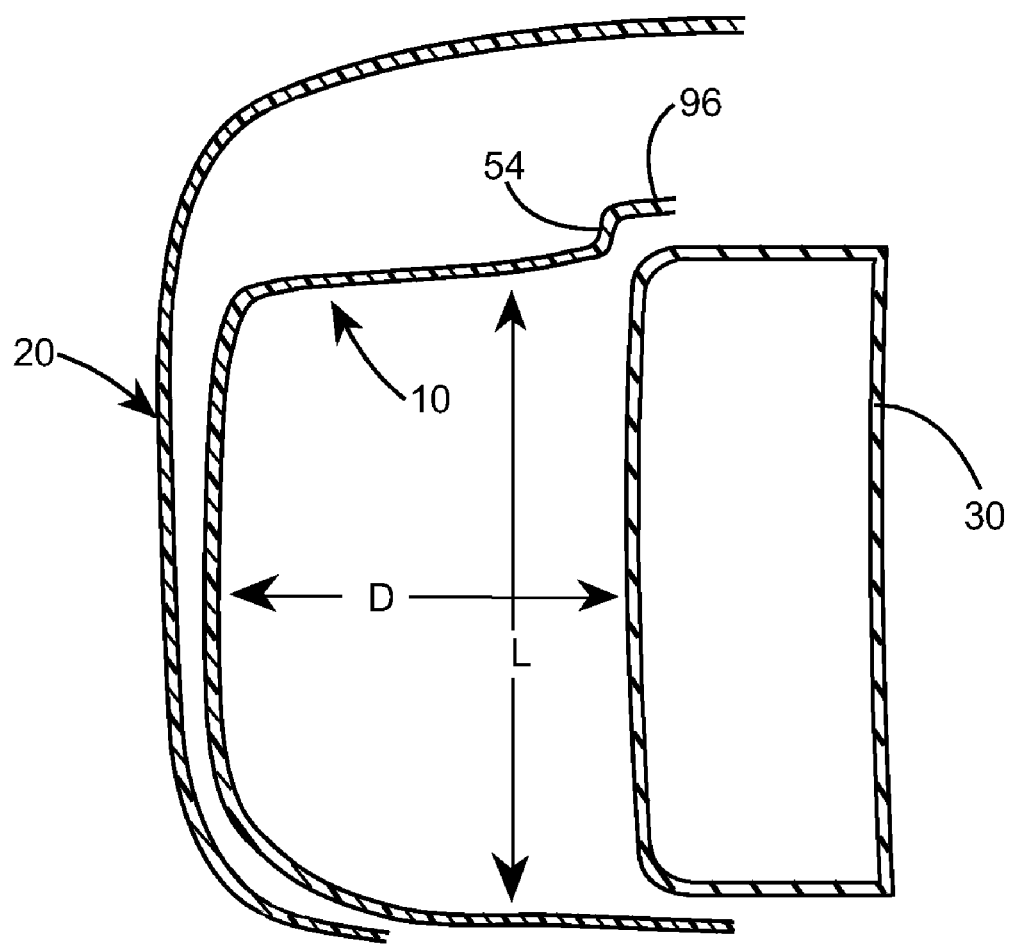
FIG. 2 is a schematic cross-sectional view taken through the energy absorber of the present disclosure illustrating the positional relationship to a bumper beam and a fascia cover to the absorber when installed in a vehicle.

Regarding the present disclosure, in one example, an energy absorber 10 may be positioned between a front or rear fascia 20 and a structural bumper beam 30 for a vehicle, as shown in cross-sectional view in FIG. 2. The bumper beam may be a metal open or closed cross-section 30 having a thickness of about 2-3 mm, mounted at the front and/or rear of a vehicle and capable of absorbing impact forces with other stationary or moving objects. At speeds of 5 mph and less, the bumper beam may be relatively unaffected by such impacts. At higher speeds, the bumper beam 30 may undergo some permanent distortion upon impact. The fascia 20 may generally be a plastic molded shape having a thickness of about 2-3 mm which overlies and generally covers the energy absorber 10 and bumper beam 30 and is shaped and color-coordinated to provide an aesthetically pleasing appearance for the ends of the vehicle. The energy absorber and fascia may attach directly to the bumper beam. The energy absorber 10 may have a channel shape in cross-section which may be capable of deflecting and crushing under a low speed impact to the front or rear of the vehicle to absorb energy and prevent substantial damage to the vehicle, according to MVSS 215.

Figure 3:
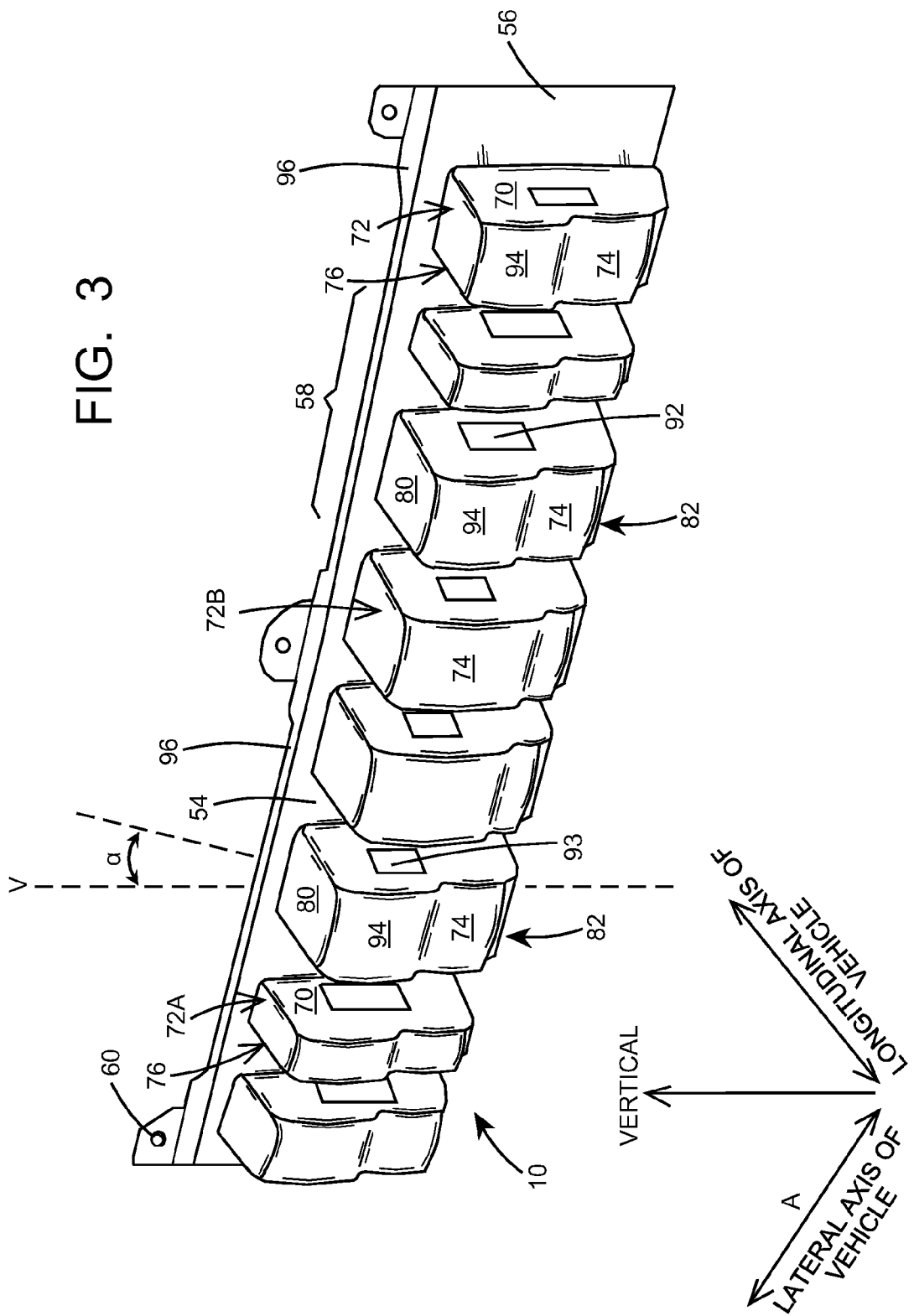
FIG. 3 is a perspective view of the energy absorber of the present disclosure at the general attitude at which it would be disposed in a vehicle.

FIG. 3 is a perspective view of an exemplary embodiment of the energy absorber 10 of the present disclosure arranged in a position to approximate the attachment of the energy absorber 10 to a bumper beam 30 on a vehicle. The energy absorber 10 has a generally elongate shape that may extend across the vehicle and has a longitudinal axis generally coinciding with the lateral axis of the vehicle (see Arrow A). The energy absorber 10 further comprises at least one corrugated section 58 which may include a plurality of channels 72.

"Corrugated" as used herein refers to a plurality of channels that have a length dimension generally parallel with one another, the length dimension extending in a plane that is not parallel with the longitudinal axis of the absorber 10.

"Channel" as used herein refers to a structure having a front wall and two side walls, and optionally with one or two end walls which, when mounted in a vehicle, may cooperate to provide a structure for absorbing energy when the channel is subjected to an outside impact force. The side walls of the channel may correspond to the length dimension of the corrugated section and may extend in a generally up and down direction when assembled in-car. Generally, the length (L) of the side walls may be greater than the depth (D) of the channel. See again, FIG. 2.

FIG. 3 shows a perspective view of the energy absorber 10 approximately as installed at the rear or front of a vehicle. The energy absorber 10 includes one or more corrugated sections 58 which may include a plurality of channels 72 which may have different widths and/or spacing in between. The channels 72 may include side walls 70, 76 and a front wall 74. The channels 72 may also include one or two end walls 80, 82. The side walls 70 may include openings of different sizes and shapes 92, 93 or no openings at all 76. Likewise, the end walls 82 may include openings of different sizes and shapes (not shown) or no openings at all 80. The side walls 70, 76 may extend at an angle α that is ±45° from the vertical V, as shown in FIG. 3.

As shown in FIG. 3, the distance between, for instance, end walls 80 and 82, that is the length of side walls 70 and 76 (essentially vertically in-car) is greater than the depth of the channels or corrugations, that is, the distance between front wall 74 and base 54 (for-aft in-car). This is also shown schematically in FIG. 2.

The front wall 74 of the channels may include openings or an engagement feature, such as a depression or groove 95 or ridge or stepped feature such as 94 which may complement the inside surface of the fascia and provide support. In addition, the front wall 74 may be designed with a similar protrusion 94 that may prevent an over-ride condition in the event of a high impact. Similarly, a protrusion may be placed at the bottom of the front wall 74 to reduce the chance of under-ride in a low impact.

The energy absorber 10 may further include a base portion 54 which interconnects the channels 72 and may extend outward from the channels 72 to form a periphery (see FIG. 3). A portion of the periphery may comprise attachment section 56, attachment openings 60 and one or more flanges 96 that may extend at an angle from the base 54 (see FIG. 2) and generally fore-aft in-car. The attachment openings and/or attachment sections may be reinforced with metal sections at prescribed locations by insert-molding such during the injection molding process.

The channels may be of different widths, 72 vs. 72A vs. 72B, to accommodate different impact requirements across the width of the vehicle. While shown here as a generally planar elongate shape, it is contemplated that the energy absorber 10 may be formed to shape to curve to conform to the front contour of the vehicle and/or extend more sharply rearward or forward in-car to wrap around the corners of the vehicle and provide corner and side protection in addition to front and rear low speed impact protection.

Figure 4:
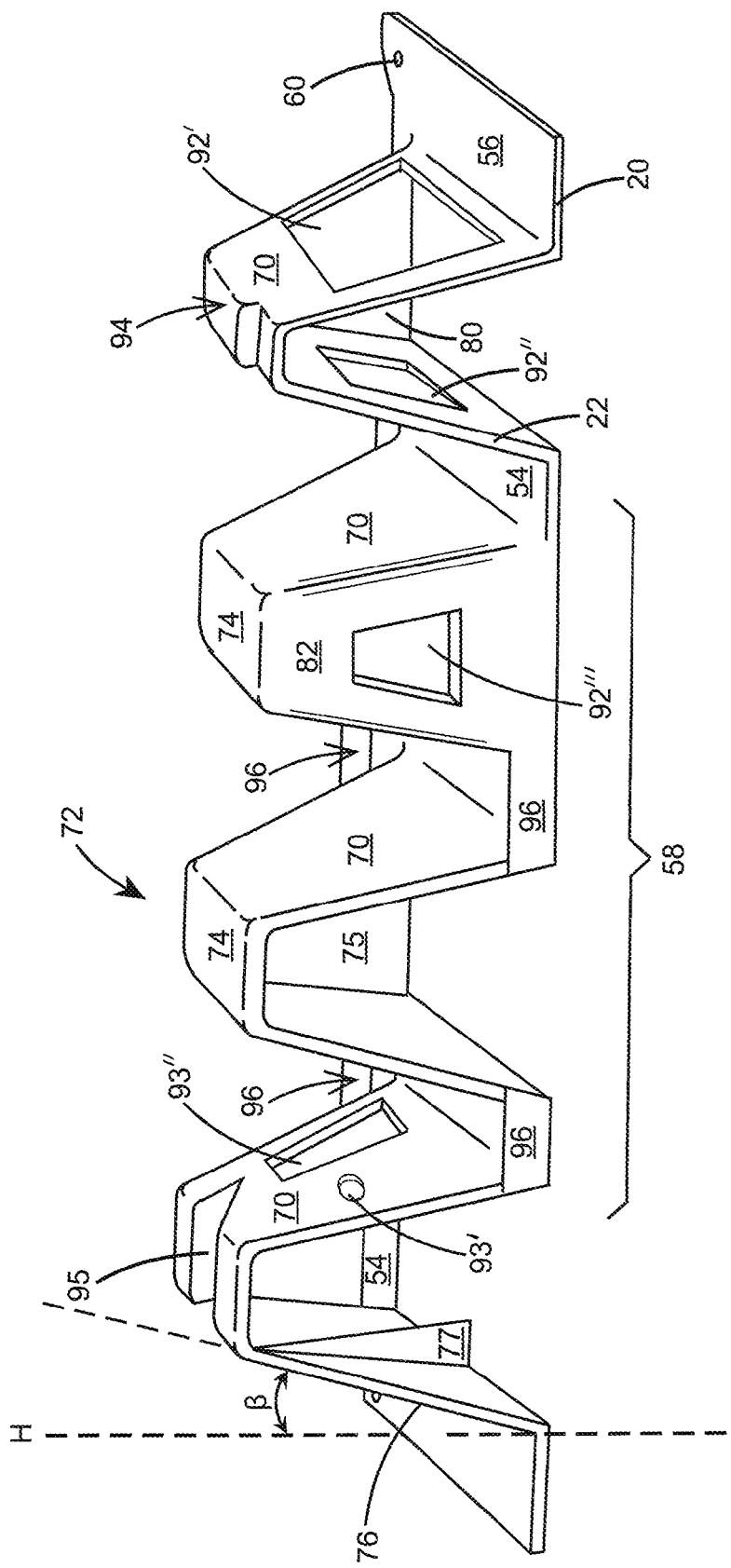
FIG. 4 is a different perspective view of an exemplary energy absorber of the present disclosure, illustrating numerous features that may be added or deleted to tune the impact resistance at various locations along that energy absorber.

The energy absorber 10 may be "tuned" to provide a desired level of resistance to impact forces. FIG. 4 is a perspective view from a lower viewing angle of another exemplary embodiment of the energy absorber 10 of the present disclosure, illustrating a variety of "tools" that may be used to tune, or adjust, the impact performance.

For example, the side walls 70, 76 of the channels may have openings or windows 92', 92", 93', 93" extending therethrough. By removing the material that would otherwise occupy this space, the strength and resistance to deformation, for instance, bending, crushing or crumpling, of the channels can be modified. Additionally, end walls 80, 82 or ribs 75, 77 that are transverse to the primary extending side walls 70, 76 of the channel (in other words, substantially cross-car) may be added thus providing a further connection between the primary side walls and thereby increasing the resistance of the channels to distortion upon impact. These transverse walls may also include openings or windows, for instance 92''' defined therein to allow for further "tuning" of the energy absorber's resistance to impact forces. Again, the thickness (22 vs. 20) of the walls may be varied to tailor or tune the impact performance for the specific size and weight of vehicle that it will be installed. In addition, the thickness of the individual walls themselves may not be constant and may vary over a given wall area.

Further "tuning" of the energy absorber may be possible to allow different portions of the energy absorber to provide differing levels of resistance to impact forces. For example, the use of a rib 77 on only one side of a channel 72 may leave the channel stronger or more resistant to crumpling on the side where the rib is located as compared with the opposite side of the channel where no rib has been attached. The rib 77 may extend only a short distance from the inside of side wall 76 or may extend 75 nearly the full width between walls 70 and 76.

Further, flange portions 96 may extend locally, generally in a fore-aft direction in-car, to provide edge stiffness and control distortion of the base 54 during impact.

Additionally, the opening or window 93" in the primary walls 70 of the channel 72 may be positioned such that a center of the opening or window may be closer to one end of the channel end walls and more distant from the other. This off-center positioning of the window opening will make the end of the channel that is closer to the center of the window/opening weaker than the end of the channel that is more distant from the center of the window/opening.

Placing a transverse wall 80 along one end of a channel 72 and defining an opening 92" closer to the other end of the channel permits even greater latitude in designing energy absorbers having a differing resistance to impact along the energy absorber's vertical axis. This may be useful to provide local structure and impact resistance to an area that might, for instance, have a more stringent impact requirement, for instance as in the case of a high vs. low impact (for instance, 16 vs. 20 inch pendulum height).

Still further "tuning" of the energy absorber of the present disclosure may be possible by varying the height, depth, width, thickness and number of the channels. Varying the depth of one channel relative to an adjacent channel may allow a stepped impact response as opposed to a gradual impact response, and may allow for greater penetration of the impacting body. Varying the width (laterally in-car) (72 vs. 72A vs. 72B in FIG. 3), number and spacing of the channels may allow the impact protection to be spread over a larger or smaller area, and combined with the other tuning factors described herein, may allow local tuning to address pole or angled impacts.

Further, as shown in FIG. 4, the side walls of the channels 70, 76 may be angled from the horizontal plane H (in-car) by an angle β of 0-45°.

Another significant factor in "tuning" is the material for formation of the energy absorber. It is contemplated that the energy absorber 10 of the present disclosure may be formed preferably as a single piece molding (i.e., monolithic) although the assembly of multiple pieces together, for instance corrugations, is contemplated. Plastics are particularly useful for forming energy absorbers according to the present disclosure because they can be relatively rapidly molded into complex shapes with varying thickness, including openings, straps, ribs, additional walls, etc. in a single operation. Further, plastics are of relatively light weight and may have metal reinforcements insert-molded into their construction for reinforcement, for instance of attachment sections 56.

Additionally, attachment opening 60 may include an insert-molded metal section having a threaded hole for attachment to the bumper beam 30.

The energy absorber 10 may be produced by, for instance, injection molding, compression molding, blow-molding (two or more at a time), transfer molding or combinations thereof, or other processes known to those skilled in the art.

Suitable plastics may include thermoplastic and thermosetting resins. Examples of particularly useful resins may include polypropylene and polyurethane. More specific examples from which such energy absorbers may be formed are homopolymers and copolymers of polyethylene, homopolymers and copolymers of polypropylene, thermoplastic olefins, thermoplastic urethanes, polycarbonate, acrylonitrile-butadiene-styrene and blends of acrylonitrile-butadiene-styrene and polycarbonate. Additionally, the plastic resins used in the manufacture of the subject energy absorber may be reinforced with fibers, such as glass or natural fibers, particles, such as talc or calcium carbonate, and other fillers up to and including about 40% by weight to further tailor such properties as stiffness (modulus), elongation, notched impact resistance and tear strength. The plastic resin may also be foamed (for instance, foamed polypropylene).

The absorber 10 may preferably comprise a high flow, high impact polypropylene copolymer resin such as Pro-fax® SG802N from LyondellBasell Industries or a crystalline homopolymer polypropylene resin.

Generally, the wall thickness of the absorber 10 will be in the range of about 2.0 to about 5.0 mm in increments of 0.1 mm, for instance, 2.1 mm, 2.2 mm, 2.3 mm, etc. As noted, the thickness may vary within an absorber 10' as shown at reference numeral 20 vs. 22 in FIG. 4. Thicker sections of the absorber 10 may be preferably formed by gas assist molding.

The channels 72 may generally be, for instance, about 110-160 mm in length (vertical dimension in-car), about 45-220 mm in width (across car) and about 30-100 mm in depth (front wall 74 to base 54). The channels may be separated by a distance of about 50 to about 200 mm. Further, the outside radii at the forward corners may be in the range of 3-6 mm.

Using the above described methods and principles, an energy absorber may be designed and mounted to the front or rear of a vehicle such that the energy absorbing requirements of CMVSS 215 may be satisfied. Again, this is the ability to accommodate two longitudinal pendulum impacts at 5 mph (height between 16 and 20 inches), one corner high pendulum impact at 3 mph (pendulum impacts shall be spaced apart by at least 2 inches vertically or 12 inches horizontally) and a flat barrier conducted at 5 mph, the impacts done in series, wherein the impacts do not lead to paint/finish separation, fastener breakage and one or more of the following: lamps and reflectors are free of cracks; headlamps are adjustable per part 108.1 and SAE J599; hood, trunk and doors operate normally; fuel and cooling systems operate normally with no leaks; the exhaust exhibits no leaks or constrictions; and the propulsion, suspension, steering and braking all operate in normal manner.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. An energy absorber for a vehicle having a bumper beam, the energy absorber comprising:
    a molded elongate member having a longitudinal axis, engaged to said bumper beam and including one or more corrugated sections, the corrugated sections including a plurality of channels, said channels having a length of 110-160 mm, a width of 45-220 mm and a depth of 30-100 mm, said length of the channels extending in a plane that is not parallel with the longitudinal axis of the member;
    wherein the channels include a front wall and a pair of spaced apart vertically extending side walls having a length, and one or two at least partial end walls;
    wherein said vertically extending side walls have a length that is greater than said depth;
    the elongate member further including a base section extending between said channel walls and one or more flange portions that extend from said base;
    at least one attachment section for engagement to said bumper beam;
    wherein at least one side wall of said pair of side walls of at least one of said channels includes at least one opening completely defined by said at least one side wall;
    wherein said plurality of channels are separated by 50 mm to 200 mm; and
    wherein one side wall of said pair of side walls of at least one of said channels is more resistant to crumpling than the other side wall.

2. The energy absorber of claim 1, wherein the side walls of the plurality of channels extend generally parallel to one another.

3. The energy absorber of claim 1, wherein said at least one side wall of said pair of side walls of at least one of said channels includes at least two openings completely defined by said at least one side wall; and
    wherein said openings vary in size.

4. The energy absorber of claim 3, wherein each side wall of said pair of side walls of at least one of said channels includes at least two openings completely defined by each of said side walls; and
    wherein said openings of each of said side walls vary in size.

5. The energy absorber of claim 1, wherein one or more of said side walls and said end walls include one or more ribs.

6. The energy absorber of claim 1, wherein said side walls, said end walls, said front walls, said base and said flanges may be different in thickness from one to another or vary therewithin.

7. The energy absorber of claim 2, wherein said side walls extend generally vertically, ±45°.

8. The energy absorber of claim 2, wherein said side walls form an angle with said base of 45-90°.

9. The energy absorber of claim 1, wherein said plurality of channels vary in depth.

10. The energy absorber of claim 1, wherein said plurality of channels vary in width.

11. The energy absorber of claim 1, wherein said plurality of channels vary in the spacing therebetween.

12. The energy absorber of claim 1, wherein said front wall includes an engagement feature for supporting a fascia.

13. The energy absorber of claim 1, wherein said elongate member comprises injection molded thermoplastic.

14. The energy absorber of claim 1, wherein said elongate member comprises polypropylene.

15. The energy absorber of claim 1, wherein said side walls, end walls, front walls, base and flanges have a thickness in the range of 2.0 mm, to 5.0 mm.

16. An energy absorbing system for a vehicle, the system comprising:
    a bumper beam;
    an energy absorber, said absorber comprising a molded elongate member having a longitudinal axis, and including one or more corrugated sections, the corrugated sections including a plurality of channels, said channels having a length of 110-160 mm, a width of 45-220 mm and a depth of 30-100 mm, said length of the channels extending in a plane that is not parallel with the longitudinal axis of the member;
    wherein the channels include a front wall and a pair of spaced apart vertically extending side walls, and one or two at least partial end walls;
    wherein said vertically extending side walls have a length that is greater than said depth;
    the elongate member further including a base section extending between said channel walls and one or more flanges that extend from said base and at least one attachment section mounting said absorber to said bumper beam;
    a fascia overlying said absorber and said beam;
    wherein at least one side wall of said pair of side walls of at least one of said channels includes at least one opening completely defined by said at least one side wall;
    wherein said plurality of channels are separated by 50 mm to 200 mm; and
    wherein one side wall of said pair of side walls of at least one of said channels is more resistant to crumpling than the other side wall.

17. The energy absorbing system of claim 16, wherein said at least one side wall of said pair of side walls of at least one of said channels includes at least two openings completely defined by said at least one side wall; and
    wherein said openings vary in size.

18. The energy absorber system of claim 16, wherein said elongate member comprises injection molded thermoplastic.

19. The energy absorber system of claim 16, wherein said elongate member comprises polypropylene.

20. The energy absorber system of claim 16, wherein said side walls, end walls, front walls, base and flanges have a thickness in the range of about 2.0 mm, to about 5.0 mm.

* * * * *